US012346910B2

(12) United States Patent
Sivan et al.

(10) Patent No.: US 12,346,910 B2
(45) Date of Patent: Jul. 1, 2025

(54) TRANSFERABLE AND BLENDED SHOPPING CART

(71) Applicant: Target Brands, Inc., Minneapolis, MN (US)

(72) Inventors: Jayachandran Sivan, Minneapolis, MN (US); Michael Shawn Whitsitt, Minneapolis, MN (US); Kraig Narr, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 163 days.

(21) Appl. No.: 18/480,943

(22) Filed: Oct. 4, 2023

(65) Prior Publication Data

US 2024/0029076 A1 Jan. 25, 2024

Related U.S. Application Data

(63) Continuation of application No. 17/470,587, filed on Sep. 9, 2021, now Pat. No. 11,816,675, which is a continuation of application No. 16/693,079, filed on Nov. 22, 2019, now Pat. No. 11,138,611.

(60) Provisional application No. 62/863,115, filed on Jun. 18, 2019.

(51) Int. Cl.
*G06Q 30/00* (2023.01)
*G06Q 20/20* (2012.01)
*G06Q 20/32* (2012.01)
*G06Q 30/0601* (2023.01)

(52) U.S. Cl.
CPC ........... *G06Q 30/00* (2013.01); *G06Q 20/202* (2013.01); *G06Q 20/3276* (2013.01); *G06Q 30/0603* (2013.01); *G06Q 30/0633* (2013.01)

(58) Field of Classification Search
CPC .. G06Q 30/00; G06Q 20/202; G06Q 20/3276; G06Q 30/0603; G06Q 30/0633; G06Q 20/322; G07G 1/0009; G07G 1/0081; G06F 13/14
See application file for complete search history.

(56) References Cited

U.S. PATENT DOCUMENTS

| | | | |
|---|---|---|---|
| 5,343,529 A * | 8/1994 | Goldfine | ............... G07F 7/1008 705/72 |
| 6,850,917 B1 | 2/2005 | Horn | |
| 6,876,977 B1 | 4/2005 | Marks | |
| 9,171,328 B2 | 10/2015 | Argue et al. | |
| 10,102,513 B2 | 10/2018 | Dar | |
| 10,169,806 B1 * | 1/2019 | Golwalkar | ......... G06Q 30/0633 |
| 2003/0074317 A1 * | 4/2003 | Hofi | ....................... G06Q 40/00 705/64 |
| 2004/0181454 A1 | 9/2004 | Manno | |

(Continued)

*Primary Examiner* — Florian M Zeender
*Assistant Examiner* — Vanessa Deligi
(74) *Attorney, Agent, or Firm* — Barnes & Thornburg LLP (57) ABSTRACT

A system for managing and transferring a virtual shopping cart. The system includes a product identification system that is programmed to identify products from a product identification tag, a cart identification system that is configured to generate a cart identifier that uniquely identifies the virtual shopping cart, and a cart management engine. The cart management engine is configured to receive products to add to the virtual shopping cart from the product identification system, associate the products with the cart identifier, and transfer access to the virtual shopping cart from a first device to a second device.

20 Claims, 8 Drawing Sheets

(56) References Cited

U.S. PATENT DOCUMENTS

| | | | |
|---|---|---|---|
| 2005/0144091 A1 | 6/2005 | Harper | |
| 2012/0203661 A1* | 8/2012 | Baharloo | G06Q 30/0603 |
| | | | 705/26.1 |
| 2012/0284132 A1* | 11/2012 | Kim | G06Q 20/18 |
| | | | 235/375 |
| 2013/0211953 A1* | 8/2013 | Abraham | G06Q 30/06 |
| | | | 705/26.8 |
| 2014/0188601 A1 | 7/2014 | Buset et al. | |
| 2014/0207570 A1 | 7/2014 | Cancro | |
| 2014/0214564 A1* | 7/2014 | Argue | G06Q 30/0633 |
| | | | 705/16 |
| 2014/0214572 A1 | 7/2014 | Cancro | |
| 2015/0088642 A1* | 3/2015 | Mathew | G06Q 30/0633 |
| | | | 705/26.7 |
| 2015/0142591 A1* | 5/2015 | High | G06Q 30/0613 |
| | | | 705/26.41 |
| 2016/0292677 A1 | 10/2016 | Karlsson | |
| 2017/0132690 A1* | 5/2017 | Todd | G06Q 30/0601 |
| 2018/0232778 A1 | 8/2018 | Netral et al. | |
| 2019/0114693 A1* | 4/2019 | Zhang | G06Q 30/0641 |
| 2019/0188669 A1* | 6/2019 | Escribano | G06Q 20/208 |
| 2019/0197516 A1 | 6/2019 | Gosalia | |
| 2020/0159838 A1 | 5/2020 | Kikin-Gil | |
| 2020/0394705 A1* | 12/2020 | Daie | G06Q 30/0643 |

* cited by examiner

TRANSFERABLE AND BLENDED SHOPPING CART

CROSS-REFERENCE TO RELATED APPLICATIONS

This application is a continuation of U.S. patent application Ser. No. 17/470,587, filed Sep. 9, 2021, which is a continuation of U.S. patent application Ser. No. 16/693,079, filed Nov. 22, 2019 and issued on Oct. 5, 2021 as U.S. Pat. No. 11,138,611, which claims the benefit of U.S. Provisional Application 62/863,115, filed Jun. 18, 2019. The disclosures of the prior applications are considered part of (and are incorporated by reference in their entirety in) the disclosure of this application.

TECHNICAL FIELD

This document generally relates to systems and methods for using a virtual shopping cart across multiple devices and item input methods, in addition to multiple item fulfillment methods.

BACKGROUND

Virtual shopping carts are digital data elements used in electronic shopping environments to temporarily store a collection of user-selected items from the electronic shopping environment for purchase. Virtual shopping carts are analogous to physical shopping carts in physical shopping environments (e.g., retail stores, grocery stores, home improvement stores, etc.), but they are used in digital/electronic shopping environments, such as online shopping websites and mobile apps. Like using a physical shopping cart, which include a physical receptacle to temporarily store and collect items selected by the user as they shop, virtual shopping carts collect digital shopping items that have been selected by the user during the shopping experience. Items within a virtual shopping cart can be viewed, added to, modified, and deleted, and the contents of the virtual shopping can be selected for purchase together. Digital shopping items added to a virtual shopping cart can represent physical shopping items, which can be shipped or otherwise delivered to the user.

SUMMARY

This document generally relates to systems and methods for providing transferable and blended virtual shopping carts that can be used across multiple devices (e.g., computing device with web browser, mobile app, in-store kiosk, point of sale shopping terminal), across multiple shopping environments (e.g., online shopping environments, physical shopping environments), and across multiple fulfillment channels (e.g., online fulfillment, personal delivery fulfillment, in-store fulfillment). For example, a user can initiate assembling a shopping virtual cart of items for purchase using a web browser on his/her home computer, transfer the virtual cart to a mobile app his/her mobile device, and then proceed to add items to the virtual cart using the mobile app. Adding items using the mobile app can include, for instance, selecting items from an online store that is accessed via the mobile app and/or scanning physical items (e.g., scanning product barcodes or QR codes) that the user has selected in a physical store.

Checking out using a virtual shopping cart assembled across multiple different devices and shopping environments can, similarly, be performed across any of a variety of different devices and within a variety of different environments. For instance, extending the example from the previous paragraph, the user can transfer the virtual shopping cart assembled on the user's mobile app (and previously on the user's web browser) to a point of sale terminal at a physical store. The point of sale terminal can complete the purchase of the items contained in the virtual shopping cart, as well as any additional physical items collected by the user in the physical store and scanned at the point of sale terminal. Such a blended shopping cart—combining virtual items as well as physical items—can be checked out in a single transaction, such as at a point of sale terminal in a physical store, on a user's mobile device, and/or other appropriate device.

Fulfillment of items from transferred virtual shopping carts and from blended shopping carts can be provided by any of a variety of fulfillment systems, including fulfillment using multiple fulfilment systems for an individual order. For example, a virtual shopping cart can include items multiple different sources, including items from an online store environment and items scanned from a physical store, which can each have different fulfillment options available. Some items may be available for fulfillment from fulfillment systems while other items may be available from a single fulfillment system. As a result, fulfillment may be segmented across multiple fulfilment systems. Automated fulfillment systems can be used to automatically select fulfillment systems based on one or more factors, such as selecting fulfillment systems that will minimize the number of different fulfillment channels that are used (e.g., select fulfillment system capable of fulfilling all or majority of items in cart), selecting fulfillment systems that are most efficient (e.g., selecting fulfillment system for items that can be fulfilled fastest, cheapest), and/or other factors. In some instances, users can designate fulfillment systems to be used for some or all items included in a virtual cart.

Transferring virtual shopping carts across different devices can be accomplished in any of a variety of ways, such as by designating unique identifiers/codes for a cart that can be provided to another device, selecting a unique identifier for another device to take over the cart, storing a virtual cart to a user account and subsequently logging into the account from another device to access the cart, and/or combinations thereof. For example, a user assembling a virtual cart on a mobile app who is interested in transferring the cart to an in-store kiosk may select an option to generate a unique identifier for the cart, such as a QR code, a barcode, an alphanumeric string, a unique wirelessly transmitted code (e.g., encoded near-field communication (NFC) signal), or other unique identifiers, which can be read by the kiosk device (e.g., barcode reader, optical character recognition, wireless transceiver). Such a unique identifier can be correlated with a cart management system to transfer control of the virtual cart to the kiosk device, which can subsequently download the existing items in the virtual cart, add new items to the virtual cart, modify contents of the cart, and proceed to checkout.

In one aspect, this disclosure is directed to a system for managing and transferring a virtual shopping cart. The system includes a product identification system that is programmed to identify products from a product identification tag, a cart identification system that is configured to generate a cart identifier that uniquely identifies the virtual shopping cart, and a cart management engine. The cart management engine is configured to receive products to add to the virtual shopping cart from the product identification system, associate the products with the cart identifier, and transfer access to the virtual shopping cart from a first device to a second device.

In some embodiments, the product identification system can be programmed to identify products from a scanned barcode. In another embodiment, the product identification system can be programmed to identify products from an online product catalogue. The cart identifier can be at least one of a QR code, a barcode, an alphanumeric string, or a unique wirelessly transmitted code. The cart management engine can further be configured to associate the received products to add to the virtual shopping cart with the first device. Transferring access to the virtual shopping cart from the first device to the second device can include receiving a request to transfer the virtual request from the first device, transmitting the cart identifier to the first device, and receiving the cart identifier from the second device. The cart management engine can further be configured to receive products to add to the virtual shopping cart from the second device. The cart management engine can further be configured to associate the received products to add to the virtual shopping cart from the second device with the second device. In some embodiments, transferring the virtual shopping cart from the first device to the second device further can include transferring products of the virtual shopping cart to the second device. Transferring the virtual shopping cart from the first device to the second device can further include providing access to the virtual shopping cart to the second device. Transferring the virtual shopping cart from the first device to the second device can further include removing access to the virtual shopping cart from the first device.

In some embodiments, the first device is at least one of a user computing device, a kiosk, or a POS terminal and the second device is at least one of a user computing device, a kiosk, or a POS terminal. The cart management engine can further be configured to receive a request to check-out, transmit the cart identifier to the first device, receive the cart identifier from a POS terminal, and transfer products associated with the cart identifier to the POS terminal.

In some embodiments, the system can further include a device management system configured to associate devices with the virtual shopping cart. The device management system can further be configured to permit multiple devices to add products to the virtual shopping cart. In some embodiments, the device management system can be configured to permit multiple devices to add products to the virtual shopping cart simultaneously. The device management system can further be configured to manage permissions for the multiple devices to add product to the virtual shopping cart, the device management system assigns a first device of the multiple devices with read and write permissions for the virtual shopping cart that permits the first device to view and add products to the virtual shopping cart, and the device management system assigns a second device of the multiple device with read only permissions for the virtual shopping cart that permits the second device to view but not add products to the virtual shopping cart.

In some embodiments, the device management system can associate devices with the virtual shopping cart by transmitting the cart identifier to the first device, receiving a request to join the virtual shopping cart from a third device, receiving the cart identifier from the third device, and associating the third device with the virtual shopping cart. The device management system can further associate devices with the virtual shopping cart by transmitting a notification to add the third device to the first device and receiving a confirmation from the first device to add the third device to the virtual shopping cart. The device management system can further be configured to associate products added to the virtual shopping cart by the first device with the first device and associate products added to the virtual shopping cart by the third device with the third device.

In some embodiments, the system further includes a price and promotion management system that is configured to manage prices for products and promotions that are applied to products at a cart-level. The price and promotion management system can store (i) prices for products and (ii) promotion rules that designate conditions for promotions to apply to particular products and corresponding discounts to apply the particular products. In some embodiments, a first promotion rule designates a first condition that at a particular first product and a particular second product are present in the virtual shopping cart in order for a corresponding first discount to apply, where the particular first product is different from the particular second product.

Various embodiments of the subject matter described in this document can provide one or more of the following advantages. For example, cart management systems can permit users to more seamlessly transition across different shopping environments and to maintain continuity across those environments. For instance, instead of having to either complete all shopping in an online store or to then start over in a physical store, the disclosed technology permits a user to transfer shopping carts from one shopping environment to another, and from one device to another. This can allow users to start shopping in one environment, to continue it in another environment, and to subsequently checkout in a third shopping environment, including transitioning between different virtual and physical shopping environments through blended virtual shopping carts.

In another example, blended shopping carts with items from multiple different shopping environments (e.g., online store, physical store) can be checked-out at a point of sale terminal in a single transaction for the user, even though the backend processing of the transaction can involve multiple inventory, fulfillment, and payment systems. For instance, a single transaction at a point of sale terminal can be automatically expanded into multiple different fulfillment orders across multiple different fulfillment systems, which can make blended shopping carts convenient and efficient for users.

In another example, when multiple fulfillment systems are available for an item, cart management systems can automatically select fulfillment options according to one or more metrics, which can maximize efficiency along the metrics and can permit cross-system fulfillment to provide enhanced efficiencies. For instance, one example metric can be expected time to fulfill the order, which can lead to automatic selection of fulfillment options that have the shortest fulfillment delay, such as selecting in-store fulfillment options over distribution center-based shipping options. Another example metric can be cost to fulfill the order, which can lead to automatic selection of fulfillment options with the lowest cost of fulfillment, such as selecting store-based pickup over personalized delivery options. Multiple metrics can be combined, as well, to create more sophisticated and holistic efficiency determinations. Furthermore, cross-system fulfillment options can be leveraged in order to further enhance efficiencies associated with blended shopping carts. For instance, an online retail store may be associated with shipping-based fulfillment options, but the blended shopping cart can make fulfillment of items added to the virtual shopping cart available from any of the shopping environments and their corresponding fulfillment systems. This can enhance fulfillment efficiencies.

In another example, cart management systems can permit a customer to add products to a virtual shopping cart without scanning the items while in a store. For example, products can be added via an online store, such as for products are out-of-stock. The cart management system can permit a customer to add products to the virtual shopping cart that the customer physically collected, as well as items that the customer has added via an online store. Further, the contents of the virtual shopping cart can all be purchased through a single transaction, even though they have been added from multiple different systems.

The details of one or more embodiments are set forth in the accompanying drawings and the description below. Other features, objects, and advantages will be apparent from the description, drawings, and from the claims.

DESCRIPTION OF DRAWINGS

Like reference symbols in the various drawings indicate like elements.

DETAILED DESCRIPTION

This document generally relates to systems and methods for maintaining a virtual shopping cart across multiple devices and item input methods, in addition to multiple item fulfillment methods. The technology disclosed throughout this document includes, for example, cart management systems that can permit a customer to add products to a virtual shopping cart without scanning the items while in a store. For example, products can be added via an online store, such as for products are out-of-stock. The cart management system can permit a customer to add products to the virtual shopping cart that the customer physically collected, as well as items that the customer has added via an online store. Further, the contents of the virtual shopping cart can all be purchased through a single transaction.

Figure 1:
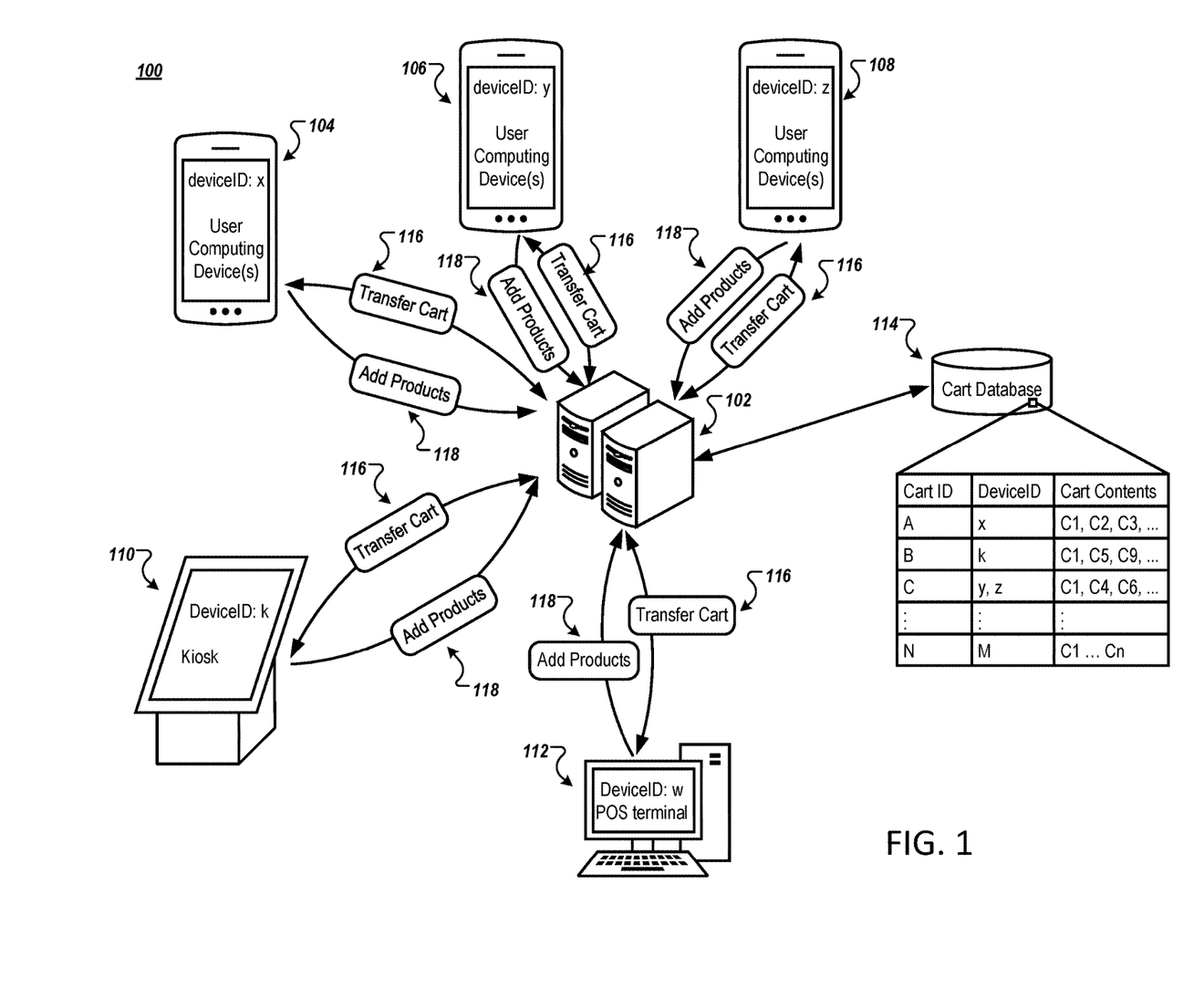
FIG. 1 is a conceptual diagram of an example system for adding products to a virtual shopping cart and transferring the virtual shopping cart between various devices.

FIG. 1 is a conceptual diagram of an example system 100 for adding products to a virtual shopping cart on a cart management system 102 and transferring the virtual shopping cart between various devices, such as user computing devices 104, 106, and 108, a kiosk 110, and a point-of-sale (POS) terminal 112.

The user computing device(s) 104, 106, and/or 108 can be any of a variety of user computing device with a display (and/or other mechanism to output information to a user) and user interface features (e.g., touchscreen, microphone with voice interface, keys, buttons), such as smartphones, smart watches, tablet computing devices, wearable computing devices, and/or others. The kiosk 110 can be any of a variety of physical apparatus or device to assist users with finding and selecting products for purchase at a retail store (e.g., brick and mortar store). For example, kiosk 110, or multiple kiosks, can be located throughout a retail store such that a user can interact. Kiosk 110 can be any of a variety of computing devices with a display (and/or other mechanism to output information to a user) and user interface features (e.g., touchscreen, microphone with voice interface, keys, buttons). POS terminal 112 can be any of a variety of user computing devices with a display (and/or other mechanism to output information to a user) and user interface features (e.g., touchscreen, microphone with voice interface, keys, buttons), such as a standard employee operated point-of-sale computing device, a self check-out computing device, and/ or others.

The user computing device(s) 104, 106, and/or 108 can include an example product detection system that is configured to detect products a user attempts to add to the virtual shopping cart. For example, the product detection system can include a camera that can detect an identifier (e.g., a barcode, a universal product code, a QR code) of a product. As another example, the product detection system can allow a user to add a product to the virtual shopping cart by selecting the product from a list or online store (e.g., from a search, a database, an ad, and/or others). Such a product detection system may perform automatic product detection remotely through communication with a remote computer system (e.g., cloud computer system). For instance, the product detection system may collect signals from cameras and/or other devices and transmit them to a remote computer system for processing and ultimate product identification. Such a configuration (local collection of product signals and transmission to a remote system for analysis and product detection) can permit for the local product detection system on the user computing devices 104, 106, and/or 108 to be simplified and to require fewer computing resources.

The kiosk 110 and POS terminal 112 can also include an example product detection system that is configured to detect products a user attempts to add to the virtual shopping cart. The product detection system can be any of a variety of systems to manually (with user direction) detect products. For example, the product detection system can be a system that includes a collection of sensors, cameras, scanners, and/or other devices to automatically detect the products as they are moved in relation to the product detection system of the kiosk 110 and POS terminal 112. Such a product detection system may perform automatic product detection locally (e.g., using a local computing device that is part of the local product detection system on the kiosk 110 or POS terminal 112) and/or remotely through communication with a remote computer system (e.g., cloud computer system). For instance, the local product detection system may collect signals from sensors, scanners, cameras, and/or other devices and transmit them to a remote computer system for processing and ultimate product identification. Such a configuration (local collection of product signals and transmission to a remote system for analysis and product detection) can permit for the local product detection system on the kiosk 110 or POS terminal 112 to be simplified and to require fewer computing resources.

In another example, the product detection system can be a scanner (e.g., barcode scanner, QR code scanner, RFID scanner) and/or other device that users can manually operate to obtain information identifying the products. For example, the product detection system can be a handheld scanner device attached to the kiosk 110 or the POS terminal 112 that users can manually operate to scan the products so they can be added to the virtual cart. The scans can generate a unique identifier for the product (e.g., universal product code (UPC)) that can be used to lookup the product information, including the product description, price, sale information, etc. As another example, the product detection system can allow a user to add a product to the virtual shopping cart by selecting the product from a list or online store (e.g., from a search, a database, an ad, and/or others).

In another example, the kiosk 110 can allow a customer to interact with an online store while in the brick and mortar location. The kiosk 110 can provide information relating to a product that is scanned, or products on an online store. For example, the kiosk 110 can provide different product offerings (e.g., colors, sizes, styles, etc.) than are offered in-store. The kiosk 110 can provide product information, product location, other product offerings, etc. when a product is scanned. Such products can be selected to be added to the virtual shopping cart. In some examples, such products may qualify for various modes of fulfillment, as will be described in further detail below.

The user computing devices 104, 106, and 108, the kiosk 110, and/or the POS terminal 112 can be connected to the cart management system 102 or gain access to the cart management system 102 via an application that can be downloaded and installed on the user computing devices 104, 106, and 108, the kiosk 110, and/or the POS terminal 112. In addition to being connected to the cart management system 102, the user computing devices 104, 106, and 108, the kiosk 110, and/or the POS terminal 112 can be associated with a virtual shopping cart. For example, in some instances the user computing devices 104, 106, and 108, the kiosk 110, or the POS terminal 112 can detect a unique identifier for a virtual shopping cart (e.g., QR code, barcode, RFID tag) that the cart management system 102 manages to associate the virtual shopping cart with one of the various devices 104, 106, 108, 110, or 112.

Once the association is established between the various devices 104, 106, 108, 110, or 112 and the cart management system 102, each device can be associated with a unique device identification number (device ID), and a new cart can receive a unique cart identifier. The cart management device 102 can maintain a cart data 114. Cart data 114 can maintain the cart ID, the device ID which is associated with the cart ID, and the contents of the virtual shopping cart. Products can be added 118 to the virtual shopping cart via the various devices 104, 106, 108, 110, or 112. In some embodiments, the products can be presented on the display of the various devices 104, 106, 108, 110, or 112. In addition, the virtual shopping cart maintained by the cart management system 102 can be transferred between the various device 104, 106, 108, 110, and/or 112 to allow additional products to be added 118 to the virtual shopping cart. Additionally, multiple devices (e.g., user computing device 106 and user computing device 108) can add products to a single virtual shopping cart.

Figure 2:
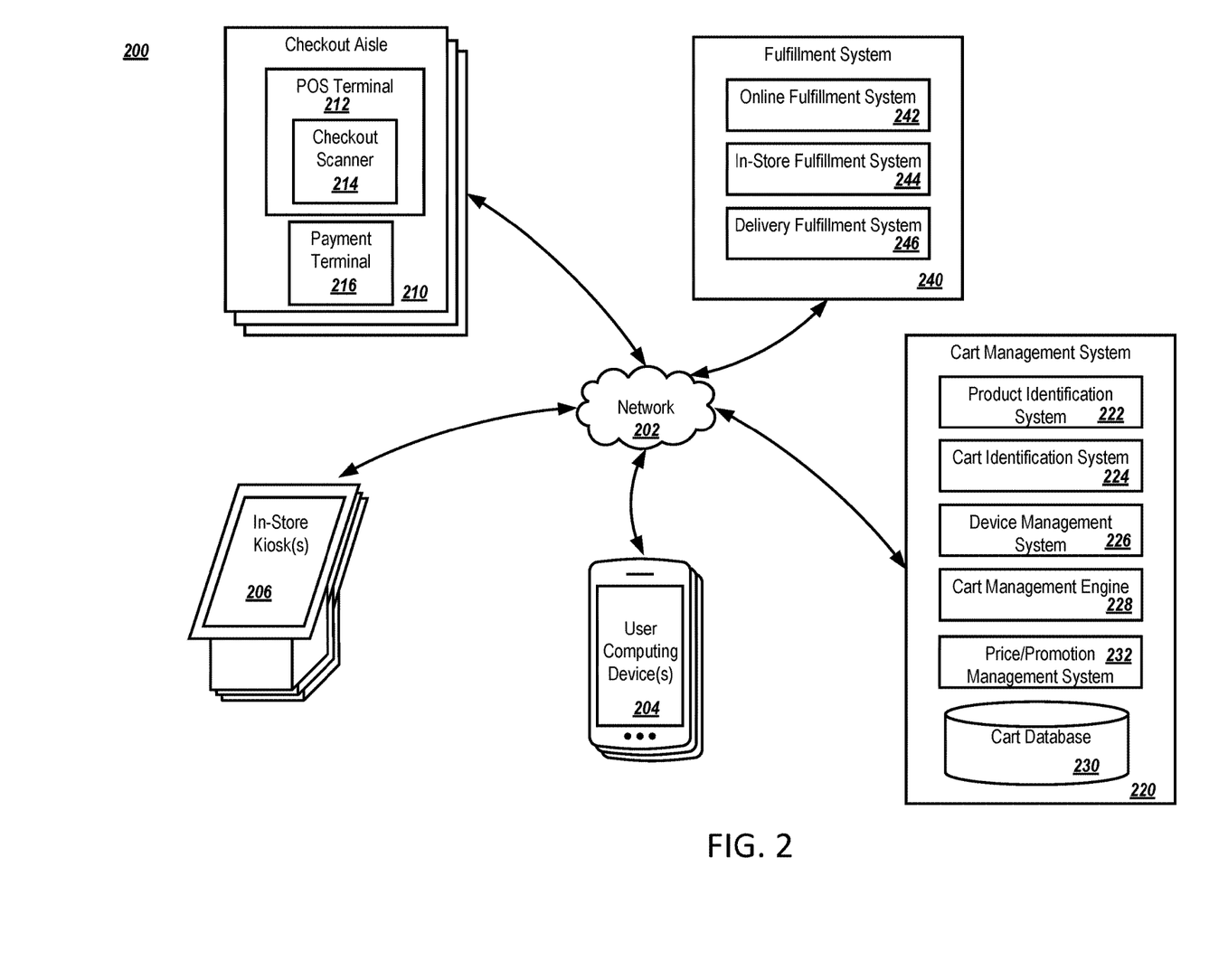
FIG. 2 is a conceptual diagram of an example system for transferring and maintaining a virtual shopping cart using a computer system.

FIG. 2 is a conceptual diagram of an example system 200 for transferring and maintaining a virtual shopping cart using a cart management system 220. System 200 can include a network 202, a user computing device 204, an in-store kiosk 206, a checkout aisle 210, a cart management system 220, and a fulfillment system 240.

The network 202 can include, for example, a mobile data network (e.g., 4G LTE network) to which the mobile computing device 202 subscribes, cellular networks, other wireless networks (e.g., open/public Wi-Fi networks within a store), and/or combinations thereof.

The user computing device 204 can be similar to the user computing devices 104, 106, and 108 described above with regard to FIG. 1. The in-store kiosk 206 can be similar to kiosk 110 described above with regard to FIG. 1.

The checkout aisle 210 can include a POS terminal 212 with a checkout scanner 214, and a payment terminal 216. POS terminal 212 can be similar to POS terminal 112 described above with regard to FIG. 1. Checkout scanner 214 can include components that are able to identify physical products so that they can be added to a virtual cart, such as during a checkout process. For example, the checkout scanner 214 can include optical scanners, RF scanners, and/or other scanning devices that can be configured to scan QR codes, barcodes, RFID tags, and/or other unique product identifiers. Payment terminal 216 can be communicably connected to POS terminal 212 to permit a user to pay for the products in cart at the POS terminal. Payment terminal 216 can be configured to receive payment information and securely transmit payment information. Payment terminal 216 can receive payment information via a magnetic strip on a card, a chip embedded in a card, and/or near-field communication with a contactless card that contains a computer chip and an antenna. Payment can receive payment via several payment methods (e.g., debit card, credit card, EBT, Apple Pay, and others).

The cart management system 220 can include a product identification system 222, a cart identification system 224, a device management system 226, a cart management engine 228, a cart database 230, and a price/promotion management system 232.

The product identification system 222 can receive signals from the product detection systems that include an identifier (e.g., a barcode, a UPC, a QR code) of a product. The product identification system 222 can lookup the product information, including the product description, price, sale information, etc. As another example, the product identification system 222 can communicate with a remote computer system (e.g., a cloud computer system) to identify products. The identified products can be added to the virtual shopping cart, with the relevant product information.

The cart identification system 224 can store information regarding virtual shopping carts. The cart identification system 224 can generate unique cart identifiers for each virtual shopping cart. The cart identifier can be a barcode, a QR code, or other scannable code. The cart identifier can be transmitted to the various devices 204, 206, and/or 208 and subsequently scanned by another of the devices 204, 206, and/or 208 and identified as associated with the virtual shopping cart by the cart identification system 224.

The device management system 226 can store the associations between the virtual shopping cart and the various devices 204, 206, and 210. These associations can be created in any of a variety of ways, as discussed above and below. For example, the devices 204, 206, and/or 210 can initiate creation of a new cart, causing cart identification system 224 to create a new unique cart identifier. As another example, the devices 204, 206, and/or 210 can receive the cart identifier from another device and transmit the cart identifier to the cart management system. The device management system 226 can then associate the device with the virtual shopping cart. Optionally, multiple devices can be associated with the virtual shopping cart. For example, multiple user computing devices can be associated with the virtual shopping cart such that both user computing devices can add products to the virtual shopping cart simultaneously. As another example, one device can be associated with the virtual shopping cart as a primary device, with a first set of permissions, and a second device can be associated with the virtual shopping cart as a second set of permissions. The first set of permissions can allow the primary device more control over the virtual shopping cart, while the second set of permissions can be more restricted. Such permissions can include, for example, whether a device is permitted to read from and write to the contents of the virtual shopping cart (e.g., view and modify the contents of the virtual shopping cart), permitted to read only from the virtual shopping cart without write permissions (e.g., view contents of the virtual shopping cart without permission to modify the virtual shopping cart), permitted to modify the permissions of other devices (e.g., designate and change which permissions are granted to other devices), and/or other permissions. For example, in some instances, one device may have R/W permissions (read and write permissions) for the virtual cart and other devices associated with the virtual shopping cart will have R/O permissions (read only permissions). In other instances, multiple devices may have R/W permissions. Other configurations are also possible.

The cart management engine 228 can communicate with the product identification system 222, the cart identification system 224, and the device management system 226 to manage the contents and information of the virtual shopping cart. Cart management engine 228 can also facilitate transfer of the virtual shopping cart. For example, cart management engine 228 can grant or remove access to the virtual cart for the various devices 204, 206, and/or 208. As another example, cart management engine 228 can transfer the contents of the virtual shopping cart from one of the various devices 204, 206, and/or 208 to another of the various device 204, 206, and/or 208.

The cart database 230 stores the contents of the virtual shopping cart based on products identified by the product identification system 222. The cart database 230 can store entries in association with the cart identifier of cart identification system 224, which then then be correlated to an associated device using information of the device management system 226.

The price/promotion management system 232 can manage pricing and promotions for products, including making cart-level pricing and promotion determinations. The price/promotion management system 232 can determine the price of products that are included in a cart, some of which may have promotions that apply to the products individually and/or collectively based on other factors. For example, promotions can be applied collectively at the cart-level based on other products that are also included in the cart (e.g., purchase product A and product B together to receive 10% discount both products). Promotions can also be applied based on other factors, such as whether the user has coupons that unlock/permit a promotion to be applied, whether the user is a member/enrolled in a group that is required to applied promotions (e.g., enrolled in membership group with retailer), and/or other factors. The price/promotion management system 232 can determine pricing for and promotions that are applied to products while the products are included in a cart and also during the checkout process.

The fulfillment system 240 can include an online fulfillment system 242, an in-store fulfillment system 244, and a delivery fulfillment system 246. When products are added to the virtual shopping cart without scanning the product (e.g., via an on-line store), the user can be prompted to select a fulfillment method for the product.

The online fulfillment system 242 can facilitate fulfillment of products through traditional online store fulfillment methods associated with the store. For example, the customer can provide an address for delivery and the products can be delivered through the mail (e.g., USPS, FedEx, UPS, etc.).

The in-store fulfillment system 244 can provide fulfillment of products such that the customer can walk out of the store with the physical products. For example, in-store fulfillment system 244 can provide a location of the selected product to the customer, and the customer can obtain the product in-store. As another example, in-store fulfillment system 244 can notify employees of the selected product, a location to deliver the product (e.g., cosmetics counter, electronics department, POS terminal, etc.) and the location can be provided to the device of the customer so the customer can retrieve the product from the designated location. As another example, the in-store fulfillment system 244 can notify an employee to deliver the selected product to the customer, for example, at the kiosk or POS terminal that the customer is interacting with when selecting the product.

The delivery fulfillment system 246 can provide fulfillment of the selected product using third party delivery services. For example, fulfillment can be provided using delivery services such as InstaCart, Amazon Prime Now, and other in-home and/or immediate delivery service providers. The customer can provide an address for delivery, and optionally, select the provider. In another example, the delivery service provider is determined based on the selected product.

Figure 3:
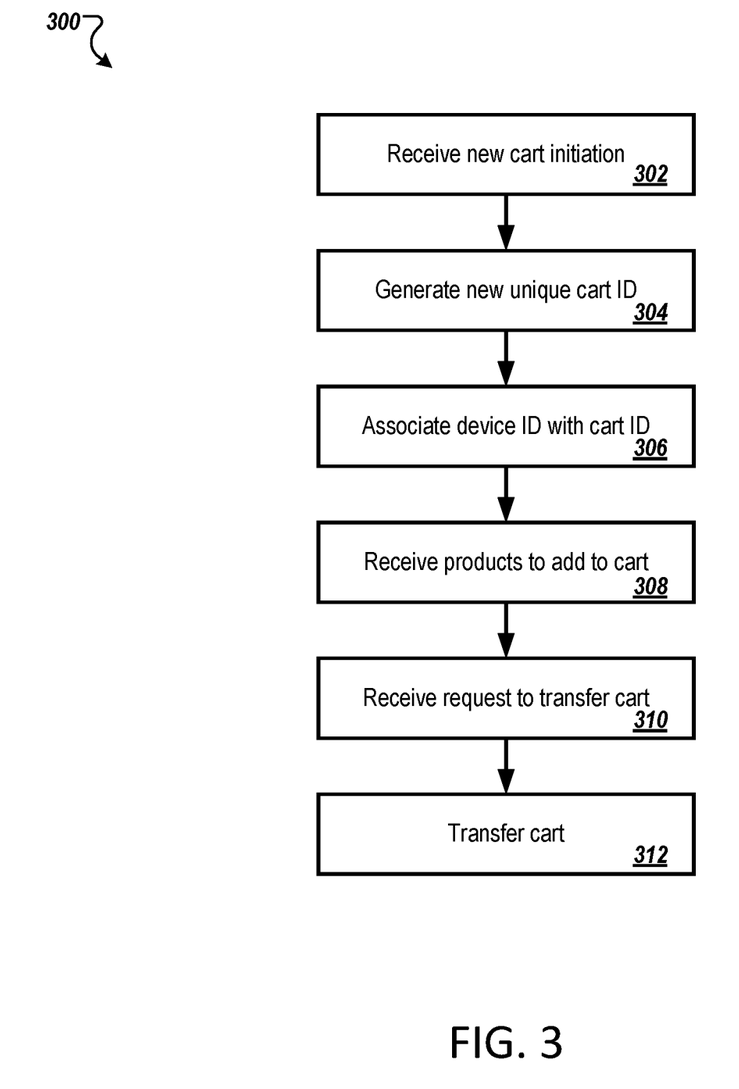
FIG. 3 is a flowchart of an example process for managing a cart with a cart management system.

FIG. 3 is a flowchart of an example process 300 for managing a cart with a cart management system. The example process 300 can be performed by any of a variety of appropriate computing device, such as the cart management system 220 described above with regard to FIG. 2.

The cart management system 220 can receive a new cart initiation (302) from a device. For example, the new cart initiation can be an attempt to add product to a virtual shopping cart (e.g., scanning a product, selecting a product on an online store, and others). As another example, a new cart initiation can be a request from a user to start a new virtual shopping cart.

The cart identification system 224 can generate a new unique cart identifier (ID) (304). The cart ID can be a barcode, a QR code, or other scannable code. The cart ID can be used by the cart management system 220 to maintain information regarding the virtual shopping cart and provide means for transferring the virtual shopping cart between multiple devices.

The device management system 226 can associate a device ID with the cart ID (306). For example, each device can receive a unique device ID. As another example, each device associated with a cart ID can receive a unique device ID. The device ID can permit a customer to identify which device(s) were used to add various products. The device ID can also be used by the cart management system 220 to monitor access and permissions for various devices.

The product identification system 222 can receive product signals for products to be added to the virtual shopping cart (308). For example, products can be received by scanning a product code or selecting a product from an online store. The products to be added to the virtual shopping cart 208 can include physical items (e.g., carry-out items) and/or items selected online. In some examples, when a product is selected online, the cart management system 220 can prompt a user to interact with fulfillment system 240 to select fulfillment options for the online product.

The cart management engine 228 can receive a request to transfer the virtual shopping cart (310). For example, the request to transfer the virtual shopping cart can be received from a first device (e.g., the user computing device 204, the in-store kiosk 206, or the POS terminal 212). The request to transfer the virtual shopping cart (310) can include information regarding the device the request initiated from. Optionally, the card management engine 228 can ensure the device requesting to transfer the virtual shopping cart has permissions to initiate a transfer. As another example, the first device can have access to the cart ID once the cart ID is generated. The request to transfer the virtual shopping cart (310) can be triggered upon receipt of the cart ID from a second device (310). In such an example, the cart management system 220 can transmit a notification to the first device indicating a second device is attempting to transfer the virtual shopping cart. The cart management system 220 can then receive an indication from the first device allowing, or denying, the transfer. Such an indication can be the request to transfer (310).

The cart management engine 228 can transfer the contents of the virtual shopping cart (312). Processes for transferring the virtual shopping cart are described in more detail with regard to FIGS. 5-7.

Figure 4:
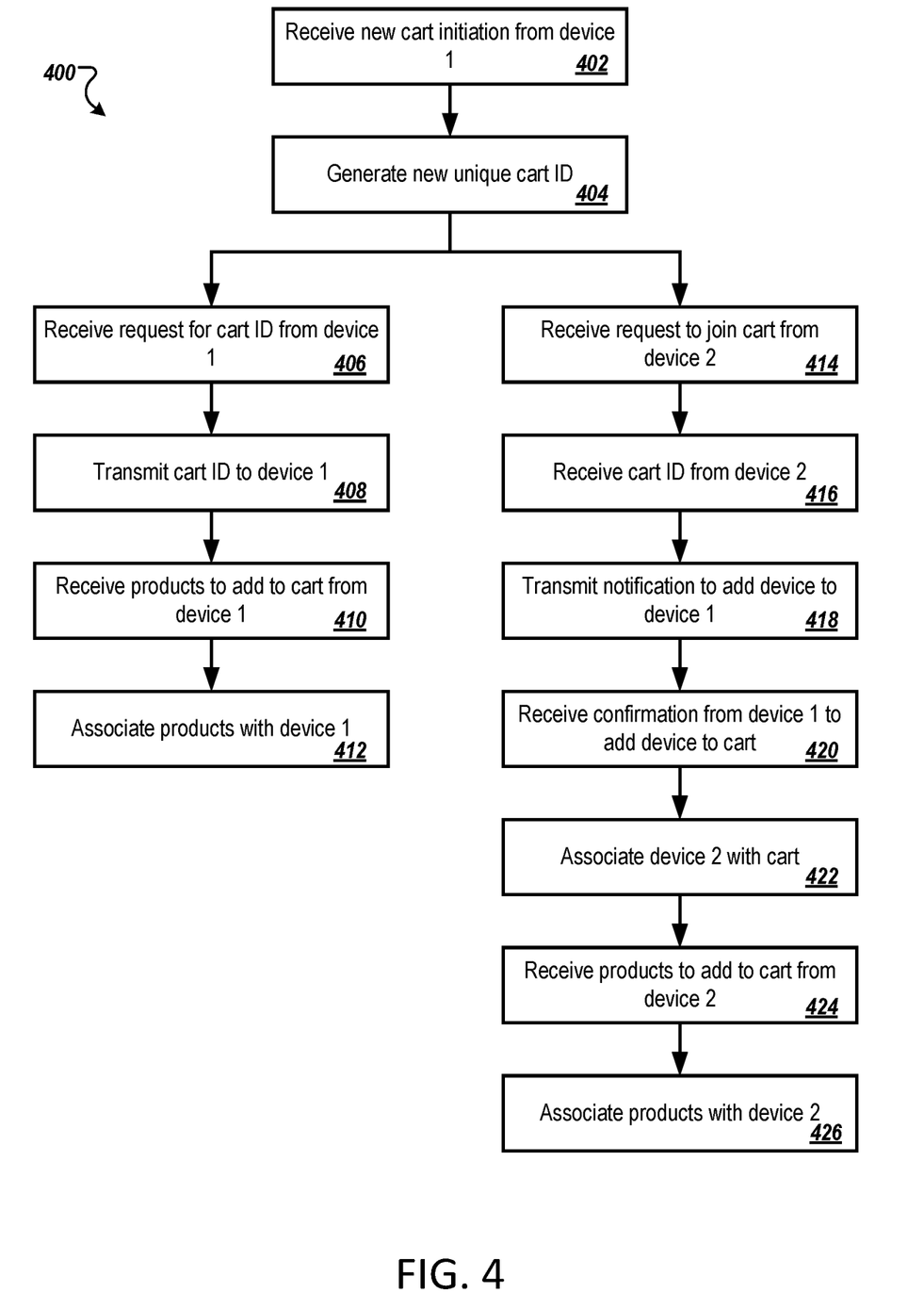
FIG. 4 is a flowchart of an example process for managing a cart with multiple devices.

FIG. 4 is a flowchart of an example process 400 for managing a virtual shopping cart with multiple devices. The example process 400 can be performed by any of a variety of appropriate computing devices, such as the cart management system 220 described above with regard to FIG. 2.

The cart management system 220 can receive a new cart initiation (402) from a first device. For example, the new cart initiation can be an attempt to add product to a virtual shopping cart (e.g., scanning a product, selecting a product on an online store, and others). As another example, a new cart initiation can be a request from a user to start a new virtual shopping cart.

The cart identification system 224 can generate a new unique cart identifier (ID) (404). The cart ID can be a barcode, a QR code, or other scannable code. The cart ID can be used by the cart management system 220 to maintain information regarding the virtual shopping cart and provide means for transferring the virtual shopping cart between multiple devices.

The cart management system 220 can receive a request for the cart ID from the first device (e.g., the user computing device 204, the in-store kiosk 206, or the POS terminal 212) (406). As another example, the first device can have access to the cart ID upon generation of the cart ID. The cart management system 220 can transmit the cart ID (408) to the first device (e.g., the user computing device 204, the in-store kiosk 206, or the POS terminal 212) associated with the virtual shopping cart.

The product identification system 222 can receive product signals for products to be added to the virtual shopping cart from the first device (410). For example, products can be received by scanning a product code or selecting a product from an online store. The products added can be associated with the device ID (412), such that the cart management system 220 maintains information regarding how the products were received.

The cart management system 220 can receive a request to join a cart from a second device (414). For example, instead of initiating a new cart, the second device can transmit a request to join an existing virtual cart, which can be received by the cart management system 220. As another example, cart management system 220 can receive the cart identifier from the second device (416), and such a receipt can be a request to join the cart. For example, the first device can present the cart identifier on the display screen, and the second device can scan the cart identifier and transmit the cart identifier to the cart management system.

The cart management system 220 can transmit a notification to the first device (418) indicating that the second device is attempting to be added to the virtual shopping cart associated with the cart ID associated with the first device. For example, the notification can be a push notification, a notification within a cart management system application, or other means of notifying the first device.

The cart management system 220 can receive confirmation from the first device (420) that the second device can be added to the virtual shopping cart. For example, the notification can provide means for quickly responding to the notification. As another example, the confirmation can include a level of permissions to be associated with the second device.

Once confirmation is received, the cart management system 220 can associate the second device with the virtual shopping cart (422), allowing the second device to modify the contents of the virtual shopping cart.

The product identification system 222 can receive product signals for products to be added to the virtual shopping cart from the first device (424). For example, products can be received by scanning a product code or selecting a product from an online store. The products added can be associated with the device ID (426), such that the cart management system 220 maintains information regarding how the products were received.

Figure 5:
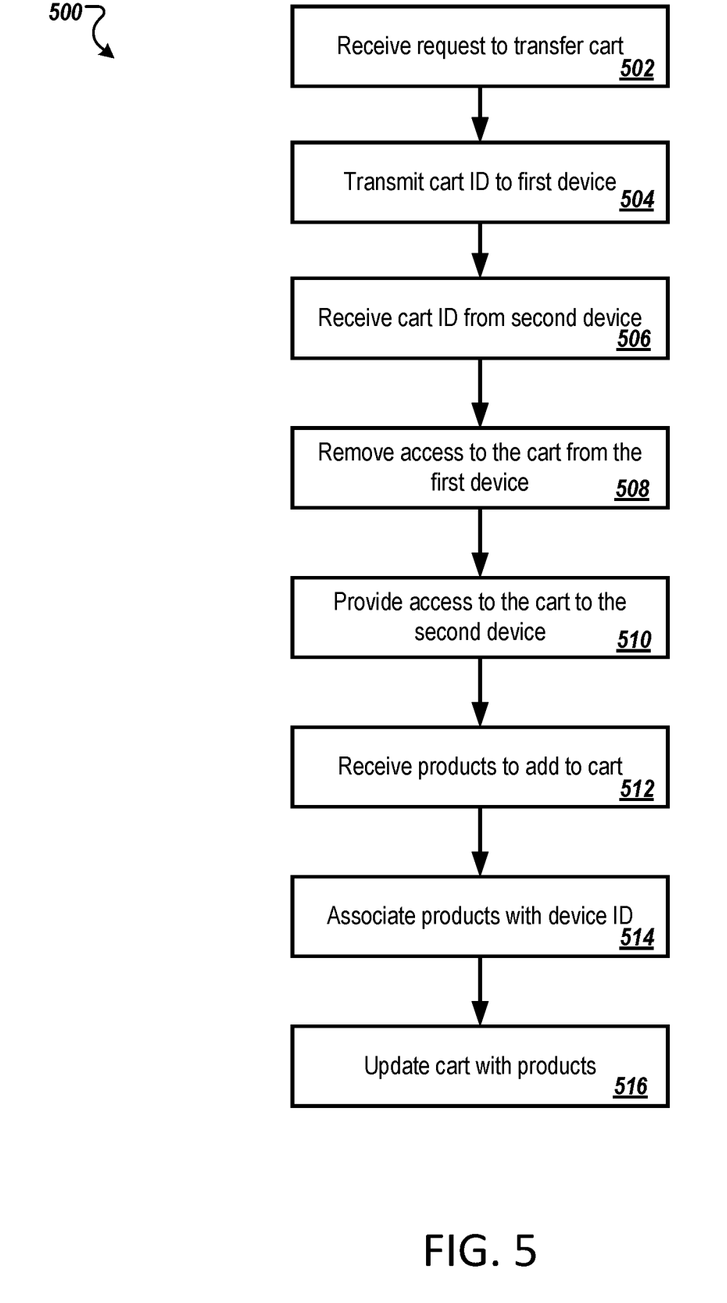
FIG. 5 is a flowchart of an example process for transferring a cart.

FIG. 5 is a flowchart of an example process 500 for transferring a virtual shopping cart. The example process 500 can be performed by any of a variety of appropriate computing devices, such as the cart management system 220 described above with regard to FIG. 2.

The cart management engine 228 can receive a request to transfer the virtual shopping cart (502) from a first device (e.g., the user computing device 204, the in-store kiosk 206, or the POS terminal 212). The request to transfer the cart (502) can include information regarding the device the request initiated from. Optionally, the card management engine 228 can ensure the device requesting to transfer the virtual shopping cart has permissions to initiate a transfer.

The cart management system 220 can transmit the cart identifier (504) to the first device (e.g., the user computing device 204, the in-store kiosk 206, or the POS terminal 212) associated with the virtual shopping cart. When more than one device is associated with the virtual shopping cart, the cart identifier can be transmitted (504) to a primary device associated with the virtual shopping cart. For example, the primary device associated with the cart identifier may be the device that the request to transfer the cart was received from, or may be a different device than the device that the request to transfer the cart was received from. For example, if two user computing devices are associated with a virtual shopping cart, one user computing device may be associated with the virtual shopping cart as a primary device, which the second user computing device may be associated with the virtual shopping cart as a secondary device. In some cases, the cart management system 220 only transmits the cart identifier to the primary device. In some cases, the cart management system 220 transmits the cart identifier to the device from which the request to transfer the cart was received.

The cart management system 220 can receive the cart identifier from the second device (506). For example, the first device can present the cart identifier on the display screen, and the second device can scan the cart identifier and transmit the cart identifier to the cart management system.

As another example, the first device can have access to the cart ID once the cart ID is generated. The request to transfer the virtual shopping cart (502) can be triggered upon receipt of the cart ID from a second device (506). In such an example, the cart management system 220 can transmit a notification to the first device indicating a second device is attempting to transfer the virtual shopping cart. The cart management system 220 can then receive an indication from the first device allowing, or denying, the transfer. Such an indication can be the request to transfer.

The cart management system 220 can remove access to the virtual shopping cart from the first device (508) and provide access to the virtual shopping cart to the second device (510). For example, the first device may no longer modify contents of the virtual shopping cart or see information relating to the virtual shopping cart. As another example, the first device can no longer modify contents of the virtual shopping cart, but may be able to see changes made to the virtual shopping cart.

The product identification system 222 can receive product signals for products to be added to the virtual shopping cart (512). For example, products can be received by scanning a product code or selecting a product from an online store. The products added can be associated with the device ID (514), such that the cart management system 220 maintains information regarding how the products were received. The virtual shopping cart can be updated with the products (516). For example, the virtual shopping cart can be updated with the products, the associated product information, and the device ID associated with the product.

Figure 6:
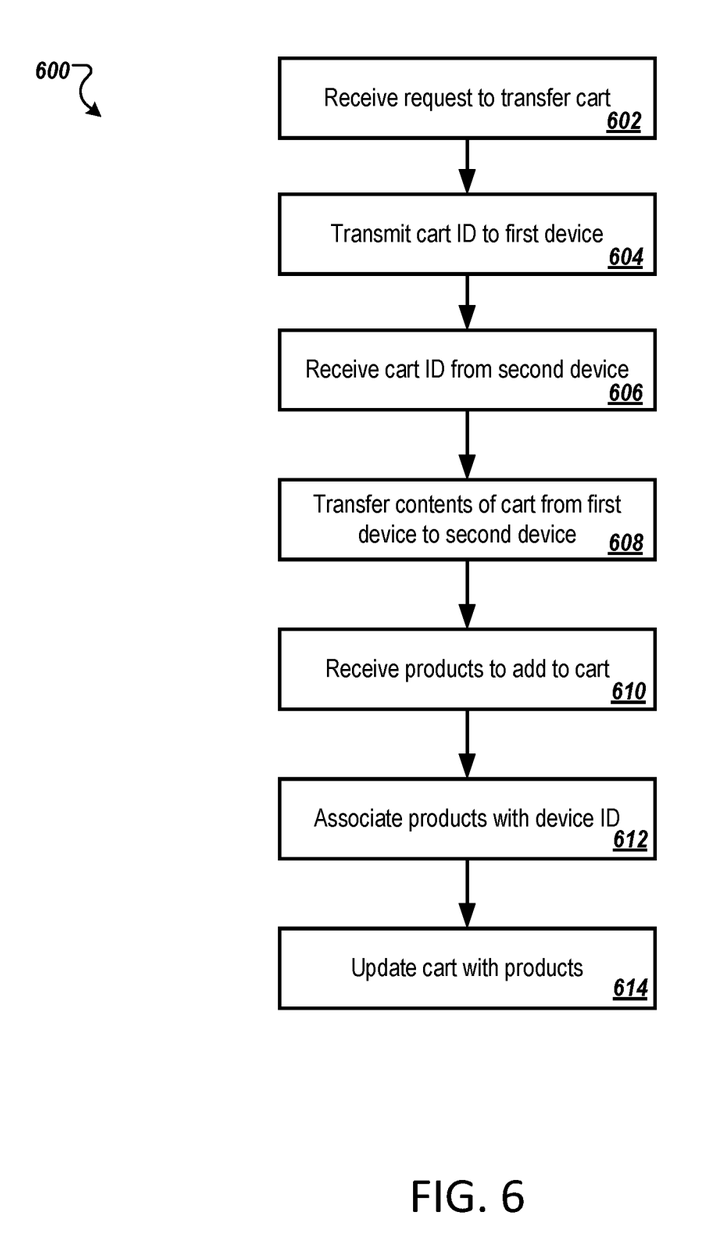
FIG. 6 is a flowchart of another example process for transferring a cart.

FIG. 6 is a flowchart of another example process 600 for transferring a virtual shopping cart. The example process 600 can be performed by any of a variety of appropriate computing devices, such as the cart management system 220 described above with regard to FIG. 2.

The cart management engine 228 can receive a request to transfer the virtual shopping cart (602) from a first device (e.g., the user computing device 204, the in-store kiosk 206, or the POS terminal 212), transmit the cart ID to the first device (604), and receive the cart ID from a second device (606). Steps 602-606 may be substantially similar to steps 502-506 of process 500.

The cart management system 220 can transfer the contents of the virtual shopping cart from the first device to the second device (608). For example, the product information of the contents of the virtual shopping cart can be transferred to the second device and removed from the first device. As another example, the cart contents can be maintained on the first device until the transfer is initiated, and then the cart contents can be removed and the contents of the cart can be transferred to the second device via the cart ID.

The cart management system 220 can receive products to add to the virtual shopping cart (610), associate products with the device ID (612) and update the virtual shopping cart with the products (614). Steps 610-614 may be substantially similar to steps 512-516 of process 500.

Figure 7:
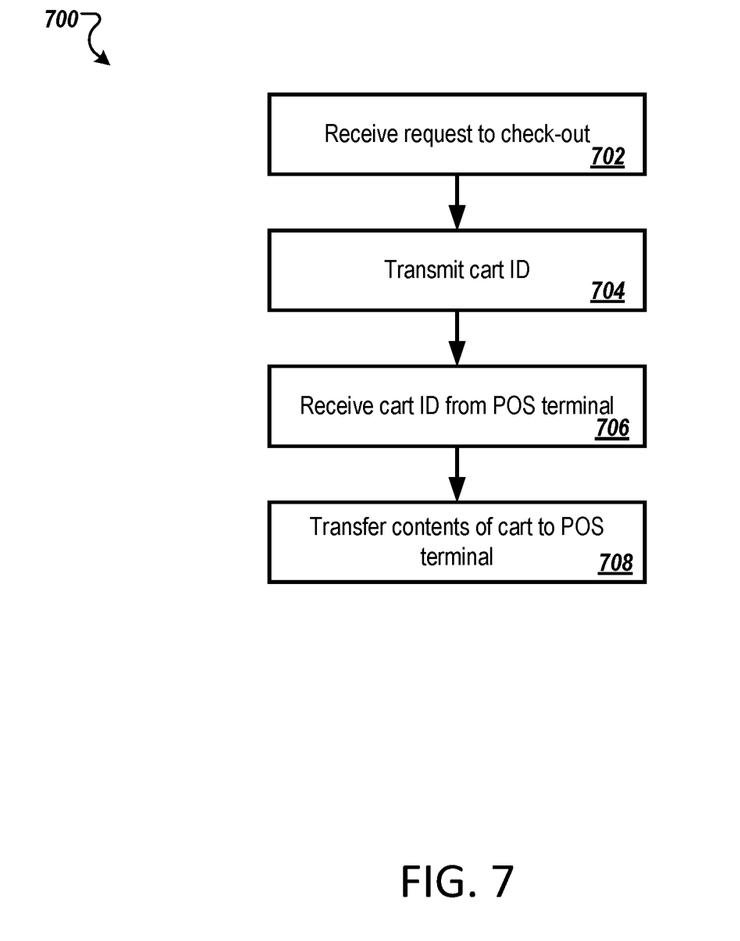
FIG. 7 is a flowchart of an example process for transferring a cart to checkout.

FIG. 7 is a flowchart of an example process 700 for transferring a cart to checkout. The example process 700 can be performed by any of a variety of appropriate computing devices, such as the cart management system 220 described above with regard to FIG. 2.

The cart management system 220 can receive a request to check-out (702) a virtual shopping cart from a device (e.g., the user computing device 204, the in-store kiosk 206, or the POS terminal 212). The request to check-out (702) can include information regarding which device the request initiated from. Optionally, the card management system 220 can ensure the device requesting to check-out the virtual shopping cart has permissions to initiate a check-out process. The cart management system 220 (e.g., cart management engine 228) can update the virtual shopping cart information to indicate that the virtual shopping cart is ready for check-out.

The cart management system 220 can transmit the cart identifier (704) to the device (e.g., the user computing device 204, the in-store kiosk 206, or the POS terminal 212) associated with the virtual shopping cart. When more than one device is associated with the virtual shopping cart, the cart identifier can be transmitted (704) to a primary device associated with the virtual shopping cart. For example, the primary device associated with the cart identifier may be the device that the request to check-out was received from, or may be a different device than the device that the request to check-out was received from. For example, if two user computing devices are associated with a virtual shopping cart, one user computing device may be associated with the virtual shopping cart as a primary device, which the second user computing device may be associated with the virtual shopping cart as a secondary device. In some cases, the cart management system 220 only transmits the cart identifier to the primary device. In some cases, the cart management system 220 transmits the cart identifier to the device from which the request to check-out was received. Optionally, the cart identifier can be identical to the cart identifier of the virtual shopping cart when the virtual shopping cart was first created. Alternatively, a unique cart identifier may be used when a virtual shopping cart is being requested for check-out.

The cart management system 220 can receive the cart identifier from the POS terminal 212 (706). As indicated above, the cart identifier may be unique to check-out, such that the cart management system 220 knows the virtual shopping cart is ready for check-out. In some cases, information associated with the virtual shopping cart indicates the virtual shopping cart is ready for check-out.

The cart management system 220 can transfer the contents of the virtual shopping cart to the POS terminal (708). For example, the product information of the contents of the virtual shopping cart can be transferred to the POS terminal. The virtual shopping cart may be removed from the cart management system 220. As another example, the POS terminal may be granted access to the virtual shopping cart, while the virtual shopping cart is still maintained in the cart management system 220. Optionally, once the contents of the cart are transferred to the POS terminal, modifications can still be made to the virtual shopping cart.

The virtual shopping cart can include both physical items that the customer has picked up in store, as well as items that were added to the cart via an online portion of the store. The entire contents of the virtual shopping cart can be purchased through a single check-out transaction.

Figure 8:
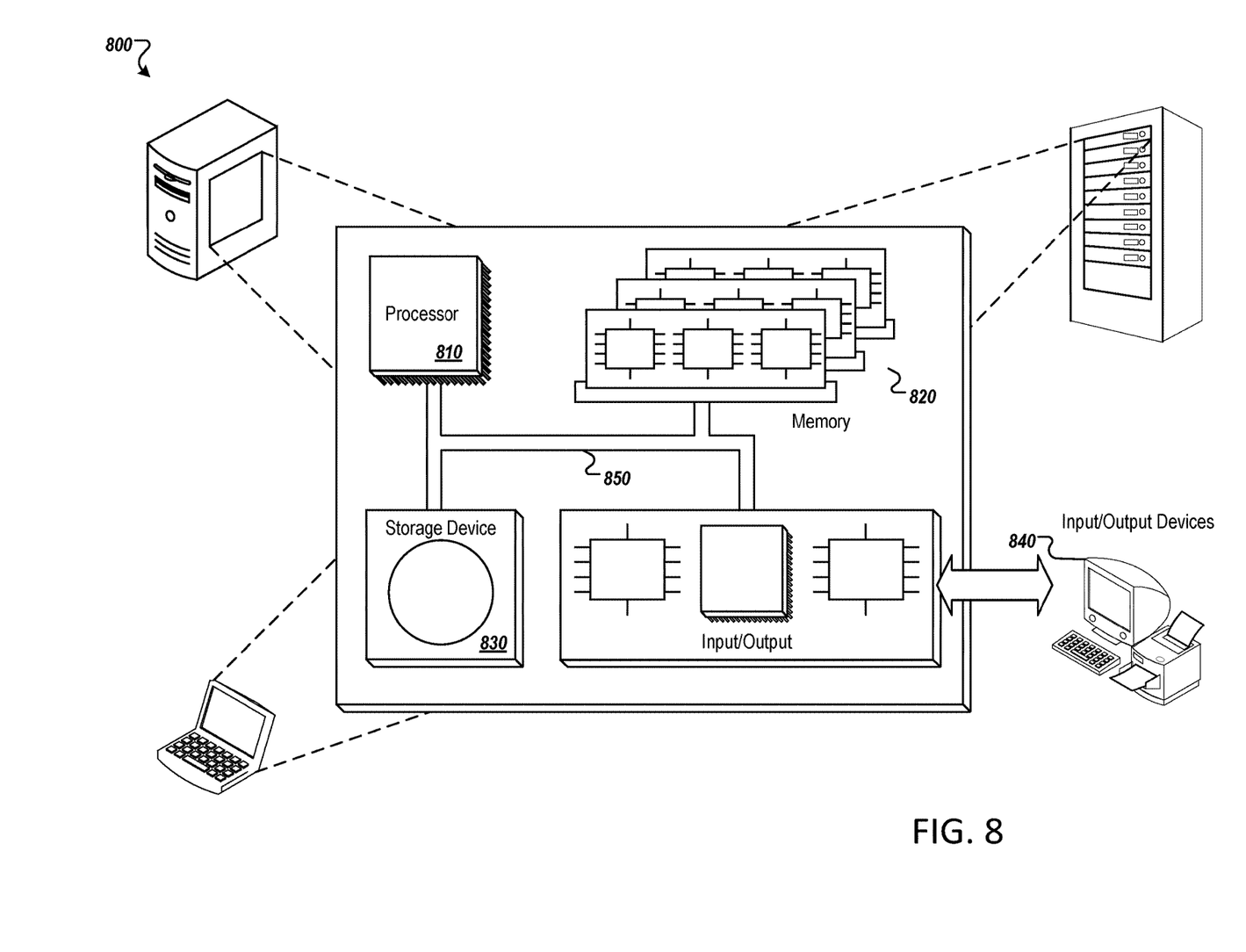
FIG. 8 is a schematic diagram that shows an example of a computing system.

FIG. 8 is a schematic diagram that shows an example of a computing system 800. The computing system 800 can be used for some or all of the operations described previously, according to some implementations. The computing system 800 includes a processor 810, a memory 820, a storage device 830, and an input/output device 840. Each of the processor 810, the memory 820, the storage device 830, and the input/output device 840 are interconnected using a system bus 850. The processor 810 is capable of processing instructions for execution within the computing system 800. In some implementations, the processor 810 is a single-threaded processor. In some implementations, the processor 810 is a multi-threaded processor. The processor 810 is capable of processing instructions stored in the memory 820 or on the storage device 830 to display graphical information for a user interface on the input/output device 840.

The memory 820 stores information within the computing system 800. In some implementations, the memory 820 is a computer-readable medium. In some implementations, the memory 820 is a volatile memory unit. In some implementations, the memory 820 is a non-volatile memory unit.

The storage device 830 is capable of providing mass storage for the computing system 800. In some implementations, the storage device 830 is a computer-readable medium. In various different implementations, the storage device 830 may be a floppy disk device, a hard disk device, an optical disk device, or a tape device.

The input/output device 840 provides input/output operations for the computing system 800. In some implementations, the input/output device 840 includes a keyboard and/or pointing device. In some implementations, the input/output device 840 includes a display unit for displaying graphical user interfaces.

Some features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM (erasable programmable read-only memory), EEPROM (electrically erasable programmable read-only memory), and flash memory devices; magnetic disks such as internal hard disks and removable disks; magneto-optical disks; and CD-ROM (compact disc read-only memory) and DVD-ROM (digital versatile disc read-only memory) disks. The processor and the memory can be supplemented by, or incorporated in, ASIC s (application-specific integrated circuits).

To provide for interaction with a user, some features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

Some features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN (local area network), a WAN (wide area network), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

What is claimed is:

1. A mobile device for managing a virtual shopping cart, the mobile device comprising:
    a camera configured to capture images of unique identifiers associated with physical products in a physical store to be purchased by a user of the mobile device;
    a product detection system configured to add the physical products to a virtual shopping cart based, at least in part, on the images captured by the camera and communication with a remote computer system that maintains a data record of the virtual shopping cart;
    a display screen configured to present, in a graphical user interface (GUI), contents of the virtual shopping cart, wherein the contents comprise the imaged physical products and virtual products from an online store to be purchased in a single transaction by the user of the mobile device; and
    a processor configured to:
        receive, from the remote computer system, a cart identifier that identifies the virtual shopping cart, wherein the cart identifier is generated, by the computer system, in response to at least one of the user adding the virtual products to the virtual shopping cart or capturing images of the unique identifiers associated with the physical products in the physical store, wherein the cart identifier creates an association between the contents of the virtual shopping cart and the virtual shopping cart;
        generate a request to transfer ownership of the virtual shopping cart from the mobile device to a second device, wherein the second device is a point of sale (POS) terminal or another mobile device;
        transmit, to the remote computer system, the request, wherein the remote computer system is configured to, in response to receiving the request, (i) generate a device identifier for the mobile device that associates the mobile device with the user and a device identifier for the second device that associates the second device with a second user, and (ii) associate the cart identifier with the device identifiers for the mobile device and the second device;

receive, from the remote computer system, the device identifier for the second device; and transmit, using the device identifier for the second device, the contents of the virtual shopping cart to the second device, wherein the second device is configured to receive user input to update the virtual shopping cart, wherein the device identifier for the second device associates the updates to the virtual shopping cart with the second user of the second device.

2. The mobile device of claim 1, wherein the processor is further configured to remove access by the mobile device to the virtual shopping cart after the ownership of the virtual shopping cart is transferred to the second device.

3. The mobile device of claim 1, wherein transferring the ownership of the virtual shopping cart to the second device comprises receiving, from the remote computer system, read-only permissions at the mobile device for the virtual shopping cart.

4. The mobile device of claim 1, wherein the processor is further configured to receive, from the second device, the updated virtual shopping cart.

5. The mobile device of claim 4, wherein receiving, from the second device, the updated virtual shopping cart comprises (i) gaining access to the updated virtual shopping cart and (ii) removing access from the second device to the updated virtual shopping cart.

6. The mobile device of claim 4, wherein the processor is further configured to add products to the updated virtual shopping cart, wherein the cart identifier associates the added products with the updated virtual shopping cart and the device identifier for the mobile device associates the added products with the user of the mobile device.

7. The mobile device of claim 4, wherein the processor is further configured to transmit, to the POS terminal, the updated virtual shopping cart, the POS terminal being configured to generate transaction information for the updated virtual shopping cart and receive a form of payment from the user of the mobile device to complete the purchase of the contents in the updated virtual shopping cart in the single transaction.

8. The mobile device of claim 7, wherein transmitting the updated virtual shopping cart to the POS terminal comprises generating a checkout cart identifier that indicates the virtual shopping cart is ready for checkout based on determining that the mobile device has permission to initiate the checkout.

9. The mobile device of claim 1, wherein updating the virtual shopping cart comprises adding one or more additional products to the virtual shopping cart.

10. The mobile device of claim 1, wherein updating the virtual shopping cart comprises removing one or more of the virtual products or the physical products from the virtual shopping cart.

11. The mobile device of claim 1, wherein updating the virtual shopping cart comprises adjusting a quantity one or more of the virtual products or the physical products in the virtual shopping cart.

12. The mobile device of claim 1, wherein the processor is further configured to determine whether the mobile device has permission to initiate the transfer of ownership of the virtual shopping cart based on identifying that the device identifier of the mobile device is associated with the cart identifier of the virtual shopping cart in cart data entries, wherein the cart data entries are generated by the remote computer system and associate devices, the virtual products, and the physical products with the cart identifier of the virtual shopping cart.

13. The mobile device of claim 1, wherein transmitting, using the device identifier for the second device, the contents of the virtual shopping cart to the second device comprises removing the contents of the virtual shopping cart from the mobile device.

14. The mobile device of claim 1, wherein the mobile device and the second device are located in the physical store.

15. The mobile device of claim 1, wherein at least one of the mobile device or the second device is remote from the physical store.

16. The mobile device of claim 1, wherein the mobile device and the second device are remote from each other.

17. A system managing a virtual shopping cart, the system comprising:

a point of sale (POS) terminal;

a mobile device comprising:

a camera configured to capture images of unique identifiers associated with physical products in a physical store to be purchased by a user of the mobile device;

a product detection system configured to add the physical products to a virtual shopping cart based, at least in part, on the images captured by the camera and communication with a cart management system;

a display screen configured to present, in a graphical user interface (GUI), contents of the virtual shopping cart, wherein the contents comprise the imaged physical products and virtual products from an online store to be purchased in a single transaction by the user of the mobile device; and a processor configured to:

generate a request to transfer ownership of the virtual shopping cart from the mobile device to a second device, wherein the second device is the POS terminal or another mobile device;

transmit the request to the cart management system;

receive, from the cart management system, a device identifier for the second device; and transmit, using the device identifier for the second device, the contents of the virtual shopping cart to the second device; and the cart management system configured to maintain a data record of the virtual shopping cart, wherein the cart management system performs operations comprising:

generating a cart identifier that identifies the virtual shopping cart in response to at least one of the user adding the virtual products to the virtual shopping cart or capturing images of the unique identifiers associated with the physical products in the physical store, wherein the cart identifier creates an association between the contents of the virtual shopping cart and the virtual shopping cart;

receiving, from the mobile device, the request to transfer ownership of the virtual shopping cart from the mobile device to the second device;

generating, in response to receiving the request, a device identifier for the mobile device that associates the mobile device with the user and a device identifier for the second device that associates the second device with a second user;

associating the cart identifier with the device identifiers for the mobile device and the second device; and transmitting the device identifier for the second device to the requesting mobile device.

18. The system of claim 17, wherein the second device is configured to receive user input to update the virtual shopping cart, wherein the device identifier for the second device associates the updates to the virtual shopping cart with the second user of the second device.

19. The system of claim 18, wherein the processor of the mobile device is further configured to:

receive, from the second device, the updated virtual shopping cart; and present, in the GUI of the display screen, the contents of the updated virtual shopping cart.

20. The system of claim 17, wherein the cart management system is further configured to perform operations comprising:

in response to receiving the request to transfer ownership of the virtual shopping cart from the mobile device to the second device, determining read-only permissions of the virtual shopping cart for the mobile device; and transmitting the read-only permissions to the mobile device.

\* \* \* \* \*